(12) United States Patent
Youn et al.

(10) Patent No.: US 8,375,224 B2
(45) Date of Patent: Feb. 12, 2013

(54) DATA MASKING WITH AN ENCRYPTED SEED

(75) Inventors: Paul Youn, Redwood City, CA (US); Daniel ManHung Wong, Palo Alto, CA (US)

(73) Assignee: Oracle International Corporation, Rewood Shores, CA (US)

( * ) Notice: Subject to any disclaimer, the term of this patent is extended or adjusted under 35 U.S.C. 154(b) by 551 days.

(21) Appl. No.: 12/616,127

(22) Filed: Nov. 10, 2009

(65) Prior Publication Data

US 2011/0113050 A1    May 12, 2011

(51) Int. Cl.
G06F 21/00 (2006.01)
(52) U.S. Cl. .......................................... 713/193; 726/26
(58) Field of Classification Search .................. 713/793, 713/193

See application file for complete search history.

(56) References Cited

U.S. PATENT DOCUMENTS

| | | | |
|---|---|---|---|
| 2004/0139043 A1* | 7/2004 | Lei et al. ............................ | 707/1 |
| 2004/0255133 A1 | 12/2004 | Lei et al. | |
| 2010/0042643 A1* | 2/2010 | Pattabhi et al. ............... | 707/102 |
| 2010/0074441 A1* | 3/2010 | Pauker et al. .................. | 380/45 |
| 2010/0284532 A1* | 11/2010 | Burnett et al. .................. | 380/28 |

OTHER PUBLICATIONS

Bellare et al., "Format-Preserving Encryption", Dept. of Computer Science & Engineering, 2009, pp. 1-25 http://www.cs.ucdavis.edu/~rogaway/papers/fpe.html.*

U.S. Appl. No. 12/228,716, filed Aug. 15, 2008.
U.S. Appl. No. 12/221,157, filed Jul. 30, 2008.
"Voltage Security Format-Preserving Encryption (FPE)," 2003-2009 Voltage Security, Inc., www.voltage.com/technology/formt-preserving-encryption.htm, print date Aug. 4, 2009, 1 page.
"Format-Preserving Encryption," Wikipedia, http://en.wikipedia.org/wiki/format-preserving_encryption; print date Aug. 4, 2009; 4 pages.
Bellare et al, "Format-Preserving Encryption," Dept. of Computer Science & Engineering 0404, University of California, San Diego, May 2009, 22 pages.

* cited by examiner

*Primary Examiner* — Jung Kim
*Assistant Examiner* — Carlos M De Jesus, Jr.
(74) *Attorney, Agent, or Firm* — Hickman Palermo Truong Becker Bingham Wong LLP (57) ABSTRACT

A method and apparatus is provided for generating a masked value from a cryptographically transformed value by using the cryptographically transformed value as a random seed, without decrypting the cryptographically transformed value. A query is evaluated against a set of data to produce a result. The result may be cryptographically transformed or unencrypted. If the result is unencrypted, the result may be cryptographically transformed to produce a random seed. If the result is already cryptographically transformed, then the result is used as the random seed. The random seed is used to generate a masked value, without decrypting the cryptographically transformed random seed value. The masked value conforms to a particular data characteristic such as a data format or a data type, which may be determined from metadata stored in a database, received with a query, or gleaned from unencrypted data. The masked value is returned as a result of the query.

31 Claims, 9 Drawing Sheets

DATA MASKING WITH AN ENCRYPTED SEED

CROSS-REFERENCE TO RELATED APPLICATIONS

This application is related to application Ser. No. 12/228,716, filed Aug. 15, 2008, by Ravi Pattabhi and Harish Akali, entitled "Virtual Masked Database," the entire contents of which is incorporated by reference herein in its entirety.

This application is also related to application Ser. No. 12/221,157, filed Jul. 30, 2008, by Ravi Pattabhi, Harish Akali, Luming Han, Xiaolan Shen, and Andrew Bodge, entitled "Maintaining Referential Integrity While Masking," the entire contents of which is incorporated by reference herein in its entirety.

FIELD OF THE INVENTION

The present invention relates to masking data based on a cryptographic seed value.

BACKGROUND

Database Servers

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command is a request to access data from a database. The command may be to perform operations on the data in the database or return the data from the database. Database commands may be in the form of a database statement. For the database server to process the database statements, the database statements supplied to the database server are statements that conform to a database language supported by the database server. One example database language supported by many database servers is SQL, including proprietary forms of SQL supported by such database servers as Oracle, (e.g. Oracle Database 10 g).

Access Control

As the database server processes commands to access data, the database server may restrict or deny access for particular users or particular applications based on roles or security privileges of the users or applications. Role Based Access Control (RBAC) is a model for enforcing security policies. In RBAC, users are assigned to roles and access control lists are specified in terms of roles. In RBAC, a role represents a job function within the context of a business or other organization with some associated semantics regarding the authority and responsibility conferred on the users assigned to the role. Very generally, an access control list is set of permissions associated with an object (e.g., a file or process in an operating system or a table in a relational database). An access control list specifies what operations can be performed on the object and who or what can perform those operations. For example, an access control list associated with a directory of a computer file system that stores customer invoices might specify that users assigned to the Accounting Role can read and write files stored in the directory.

Data Masking

In some systems, access to a set of data may be denied for a user that is not privileged to access the set of data. In other systems, instead of denying access altogether, the set of data is masked before it is provided to the user. As used herein, the term "masking" refers to the process of providing data that conforms to particular characteristics, such as data type and data format, without revealing sensitive underlying data. For example, instead of providing a requested social security number to an unprivileged user, the database server may mask the social security number by providing "XXX-XX-XXXX" or "XXX-XX-6789," where "6789" represents the last four digits of the requested social security number.

In the example, if an application expects to receive a social security number that includes numbers and hyphens, sending characters such as "X," or other input that does not match the expected format, to the application may cause the application to break. Further, one application may expect "123456789" while another application expects "123-45-6789."

Current techniques for real-time data masking are expensive to perform, requiring multiple passes of encryption of the original value until an encrypted value is produced that fits a one-to-one mapping with the set of possible masked values that match the format of the underlying data. Further, current techniques are not capable of generating data of one format from underlying data of another, different, format. Current techniques are also highly inefficient when data is masked to a different space than the underlying data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for generating a masked value from a cryptographically transformed value by using the cryptographically transformed value as a random seed to a masking function. The masked value may be generated without decrypting the cryptographically transformed value. A data value may be cryptographically transformed from unencrypted values by using an encryption technique or a hash function to cryptographically transform the unencrypted values. The encryption process may cryptographically transform data that has one or more characteristics, such as a data type or a data format, to cryptographically transformed data that does not have the same characteristics. The unencrypted values may be deleted as the cryptographically transformed values are generated and stored, and, optionally, information identifying the encryption technique or the hash function may be stored as metadata in association with the cryptographically transformed values. A query is received that requests access to the data represented by the cryptographically transformed values. In response to receiving the query, each requested cryptographically transformed value may be used as a random seed to generate a masked value, without decrypting the encrypted value. The masked value is returned as a result of the query.

In one embodiment, the masked value conforms to a particular data characteristic, such as a data format or a data type. In one embodiment, a particular data characteristic is derived from the data itself. For example, a nine digit number may be characterized as a nine digit number. In one embodiment, a particular data format for the requested data is based on metadata for the requested data that is stored in the database. For example, the metadata may indicate that a nine digit number is required for a particular field. In another embodiment, the particular data format is based on input received by an application or user that submitted the query. For example, the data format of "# # #-# #-# # # #," where "#" represents a single numerical digit, may be specified by metadata received with the query. The result is expected to conform to the specified data format.

In one embodiment, a requested encrypted value is decrypted and provided by a database server in response to a query submitted by a user with privilege to access the underlying data. In a particular embodiment, a determination is made as to whether a user is privileged to access the underlying data based on roles to which the user belongs. For example, a set of data may be accessible only to users or applications that satisfy a role specified in an access list for the set of data. A user not privileged with respect to the requested data receives a masked value generated from the encrypted value as the result of the query, and a user with privilege to access the underlying data receives a decrypted value generated from the encrypted value as the result of the query.

In a particular embodiment, the data characteristic expected for the masked value is a data characteristic that matches a data characteristic of the unencrypted values before they were cryptographically transformed. In another embodiment, the masked value conforms to a different data characteristic than both the unencrypted value and the cryptographically transformed value. For example, the unencrypted value may be a nine digit number; the cryptographically transformed value generated from the unencrypted value may be a sixteen digit hexadecimal value; and, the masked value generated from the cryptographically transformed value may be a text string of the form "# # #-# #-# # # #," where "#" is a numerical digit and "-" is a hyphen between digits. Optionally, before returning a masked result to a user, the masked result may be modified to conform to one or more of the expected data characteristics. For example, the masked result may be transformed into a string that includes a hyphenated nine digit number.

If the database server stores cryptographically transformed values, then the database server may access an index of the cryptographically transformed values in order to more efficiently process the request from the application or user. As the database server processes the request, one or more parameters of the request may be cryptographically transformed, based at least in part on information stored about the encryption technique or hash function used to cryptographically transform the underlying data. For example, a query may request a social security number associated with a particular user identifier. The particular user identifier may be cryptographically transformed before running the query against the encrypted data. In one embodiment, when evaluating the query, the database server accesses an index that is inverted over the cryptographically transformed values so that cryptographically transformed values matching the cryptographically transformed particular user identifier may be more efficiently located. For example, the value of "868157a65259cdd0" instead of "Amy Smith" may be located in the index. For a request from an unprivileged user, a result of the request is masked into masked values before the result is returned to the user.

In various embodiments described herein, a cryptographically transformed value is used as a random seed to produce a masked result value. In one embodiment, a particular number of bits from the cryptographically transformed value may be transformed into a masked result value. For example, a masked result requiring 32 bits of information uses a particular 32 bits of the cryptographically transformed value. In another embodiment, a mapping of cryptographically transformed values to masked values may be used to generate a masked result value from one of the cryptographically transformed values. For example, a first portion of possible encrypted values are mapped to a first masked value, and a second portion of possible encrypted values are mapped to a second masked value. A result that falls within the first portion of possible encrypted values would be mapped to the first masked value to generate a masked result value.

In an alternative embodiment, unencrypted values are stored in a database. A query is received from an application or user. If the application or user is associated with a role that has privilege to access the unencrypted data, then unencrypted values are returned in response to receiving the query. If the application or user does not have privilege to access the unencrypted data, then one or more requested unencrypted values are cryptographically transformed. The unencrypted values may be cryptographically transformed with a hash function, an encryption function, or any other technique for generating cryptographically transformed values. A resulting cryptographically transformed value is used as a random seed to generate a masked value. The masked value is returned as a result of the query.

Cryptographic Transformation

Modern day security practices often promote storing sensitive data in a database in a cryptographically transformed manner, using a hash function or an encryption algorithm. In other systems, unencrypted data is cryptographically transformed by a server before it is provided to a user. As used herein, a cryptographic transformation is a transformation of original, actual, intelligible, or meaningful data into unintelligible, meaningless, garbled, or random data. Cryptographic transformation may be performed to hide the actual values in case the data is obtained by someone who is not authorized to see the actual data. The cryptographically transformed data may be the result of an encryption algorithm, such as the Advanced Encryption Standard (AES) and the Data Encryption Standard (DES), which are reversible using a key. The techniques described herein are not limited to cryptographic transformations that use a key. For example, a cryptographic transformation may also be performed using a hash function such as Message-Digest algorithm 5 (MD5) and Secure Hash Algorithm (SHA-1), which are designed to be irreversible. In order to promote a clear and concise description, particular techniques are described herein with respect to encryption algorithms. A hash function or other cryptographic transformation may be substituted for the encryption algorithm to produce a random or unintelligible seed for the purposes of the techniques described herein.

In one embodiment, an encryption module may use an encryption algorithm to generate encrypted data from unencrypted data in a deterministic manner. An encryption module may execute the encryption algorithm to encrypt and/or decrypt data as the data is stored in a database. Alternately, the encryption module may execute the encryption algorithm to encrypt and/or decrypt data as the data is retrieved from the database.

Figure 1:
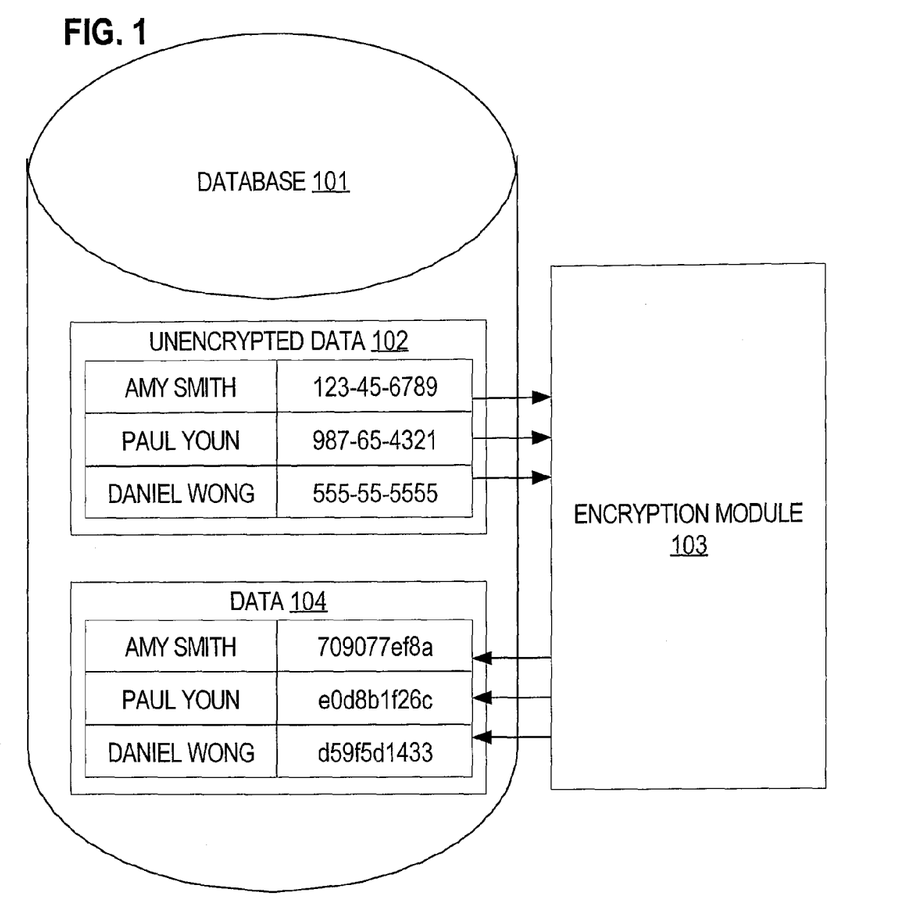
FIG. 1 is a diagram illustrating an example computer system for atomically encrypting data.

FIG. 1 shows an encryption module 103 for encrypting a set of unencrypted values from unencrypted data 102 into a set of encrypted values in data 104, which may include encrypted data and/or unencrypted data. As shown, unencrypted data 102 and data 104 are stored on a database 101. In one embodiment, the encrypted values of data 104 replace the unencrypted values of unencrypted data 102 as the encrypted values are generated. Database 101 is shown on a storage device, but database 101 may be maintained on one or more storage devices (not shown). Unencrypted data 102 and/or data 104 may be stored in database 101 or outside of database 101 on one or more other storage devices (not shown).

Encryption module 103 cryptographically transforms data using a technique such as AES, DES, MD5, SHA-1, or any other technique that can be used to create data that is unintelligible or garbled. In one embodiment, encryption module 103 encrypts data in a manner that reversible, for example, with a key. In other embodiments, encryption module 103 cryptographically transforms data in an irreversible manner using a hash function. The techniques described herein are not limited to any particular technique for generating cryptographically transformed data. As shown, data 104 includes an unencrypted column with names and an encrypted column with unintelligible data in the place of formatted social security numbers. For illustrative purposes, the encrypted value is shown to have 10 hexadecimal characters. According to the techniques described herein, the encrypted values may be of any size and any type. In an alternative embodiment, the encrypted data is stored in 16 byte blocks with $2^{128}$ possible values.

Expected Data Characteristics of Masked Data

Data may be masked in order to conform to one or more data characteristics. For example, an encrypted social security number, for example "709077ef8a" may be masked to "024-97-4689," where the masked data conforms to one or more data characteristics that indicate a format and/or a data type. In the example, the characteristics may indicate that the masked result is text having a nine digit number with hyphens between the third and fourth digit and fifth and sixth digit. As a second example, random data representing a birthday may be masked to "Jan. 31, 1986." In the second example, the characteristics may indicate that the masked result is text having a month, day, and year formatted as shown. In a third example, unintelligible data representing a credit card number may be masked to "1234567812345678." In the third example, the characteristics may indicate that the masked result is a sixteen digit number.

The characteristics may include information stored in association with the data, information received with a request for the data, and/or information that may be gleaned from the data itself. The characteristics may include a data type, such as integer, string, character, etc., and/or the data format, such as an arrangement of values, such as text or numbers, with default characters and spaces. In the first example, an encrypted social security number column may be stored in association with information that indicates that, when masked, the column should be masked as text having a nine digit number with hyphens between the third and fourth digit and fifth and sixth digit. In the second example, a request for information from an encrypted birthday column may specify that the result of the request is to be formatted in the Month Day, Year format shown above. In the third example, the database server may determine that unencrypted data in a credit card column is stored as a number with sixteen digits. If the unencrypted data becomes encrypted, the database server may store metadata describing the information gleaned from the unencrypted data. In response to a request for the data, the database server may mask a result as a sixteen digit number.

Figure 5:
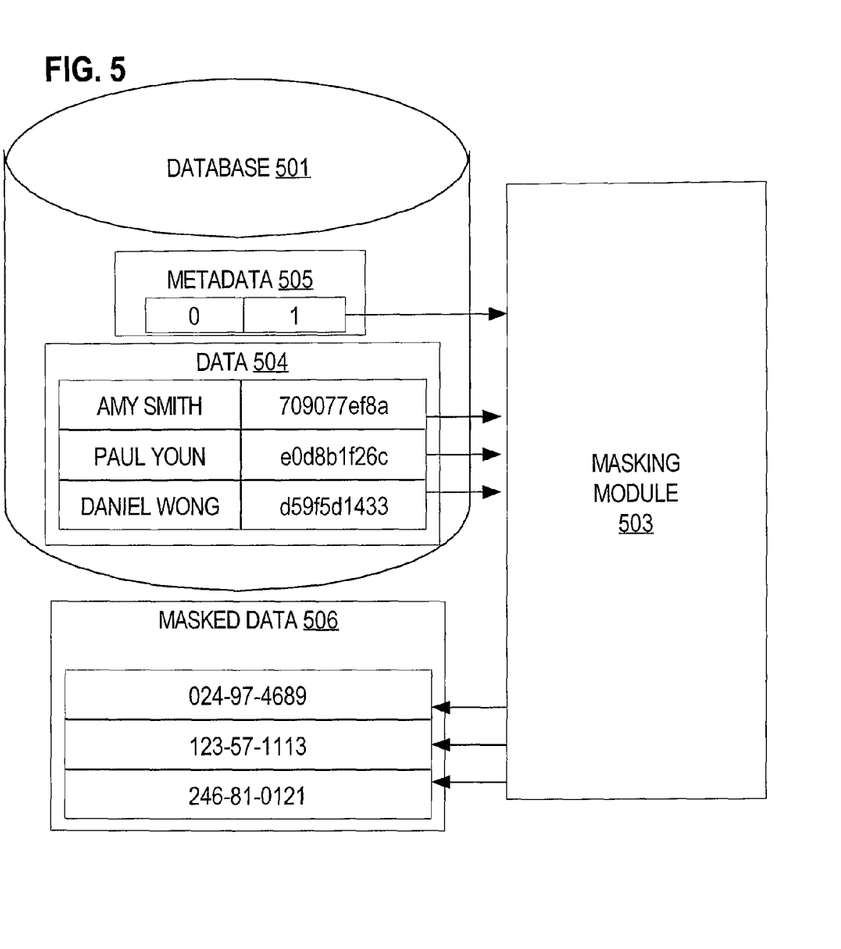
FIG. 5 is a diagram illustrating an example computer system for transforming encrypted values into encrypted and formatted values.

FIG. 5 shows a masking module 503 that masks a column from data 504 into masked data 506. In the example shown, an encrypted column in data 504 represents a social security number. Masking module 503 receives metadata 505 and encrypted values from data 504 from database 501. As shown, metadata 505 indicates that the social security number column has been encrypted. In another embodiment, metadata 505 may also include information about the expected characteristics of the social security number column when masked. Masking module 503 generates masked data 506 to conform to particular characteristics. As shown, masked data 506 is text that includes a nine digit number and hyphens.

Using Cryptographically Transformed Data for Data Masking

Cryptographically transformed data may serve as a source of entropy when generating masked data. In other words, the cryptographically transformed data may be masked directly into masked data without decrypting the cryptographically transformed data. In one embodiment, encrypted data represents a particular value from a number of possible values. For example, encrypted data with ten hexadecimal digits represents one of $16^{10}$ (1,099,511,627,776) possible values. The number of possible values may also be referred to as a space, and the particular value is a source of entropy in the space. If the result is a social security number of the form "# # #-# #-# # # #," then the result is one of $10^9$ (1,000,000,000) possible values. In the example, roughly every 1100 encrypted values may be mapped to a different masked value. In this manner, the space of the encrypted values may be separated into 1,000,000,000 relatively equal chunks. Importantly, the space of the result data does not need to evenly divide into the space of the encrypted data in order to roughly preserve the level of entropy in the system. Encrypted values may be assigned to the masked values in a single pass without requiring decryption of the encrypted values, and without requiring multiple passes over the encrypted data to accommodate for incompatible source and result spaces. The techniques described herein are not limited to any particular technique for using cryptographically transformed values as a source of entropy to generate masked values.

In one embodiment, a particular encrypted value of a discrete set of possible encrypted values may be mapped to a particular masked value of a discrete set of possible masked values. Building on the example above, a particular hexadecimal value of "709077ef8a" may be mapped to "024-97-4689."

In another embodiment, part of a particular encrypted value of a discrete set of possible encrypted values may be mapped to a particular masked value of a discrete set of possible masked values. For example, the encrypted value "709077ef8a" may be represented in binary as: "0111 0000 10(01 0000 0111 0111 1110 1111 1000 1010)," with the last 30 bits in parenthesis. The last 30 bits represent one of $2^{30}$, or 1,073,741,824 possible values. In the example, roughly every one partial encrypted value may be mapped to a different masked value. In this manner, the space of the encrypted values may be separated into 1,000,000,000 relatively equal chunks. For example, the masked result may be generated by formatting and/or type-casting the particular number of bits to the masked value based on a mapping that maps encrypted values to masked values that conform to the data format and/or the data type. The entropy in the system is roughly preserved as the encrypted values are mapped to masked values in a single pass.

Masking Results

Real time data masking involves accessing unmasked data in response to a query, and providing masked data as a result of the query. The unmasked data may be stored as either unencrypted data or cryptographically transformed data. If the unmasked data is stored as unencrypted data, then the unmasked data may be cryptographically transformed before the data is masked. Cryptographically transformed data may be used as a source of entropy, or a random seed, in order to produce a masked result of a query. In one embodiment, an encrypted random seed may be mapped to a masked result without requiring further encryption or decryption of the encrypted random seed.

In one embodiment, a database server receives a query from an application or a user. The query references, or requests access to, a set of data in a database. The database server determines whether or not the application or user is privileged to access the set of data. For example, the application or user may be associated with a role that may or may not be on an access control list for the set of data. If the application or user is not privileged to access the set of data, the database server provides a masked result generated from an encrypted seed in response to the query. If the application or user is privileged to access the set of data, the database server provides an unencrypted or decrypted result in response to the query.

In one embodiment, a database stores encrypted values and an index of the encrypted values. A user submits a query that references fields that contain the encrypted values, and the database server evaluates the query against an index of the encrypted values. The database server determines an encrypted result for the query. If the user is privileged to access the fields containing the encrypted result, then the database server decrypts the encrypted result and provides the decrypted result to the user. If the user is not privileged to access the fields containing the encrypted result, then the database server masks the encrypted result to conform to one or more characteristics.

Figure 2A:
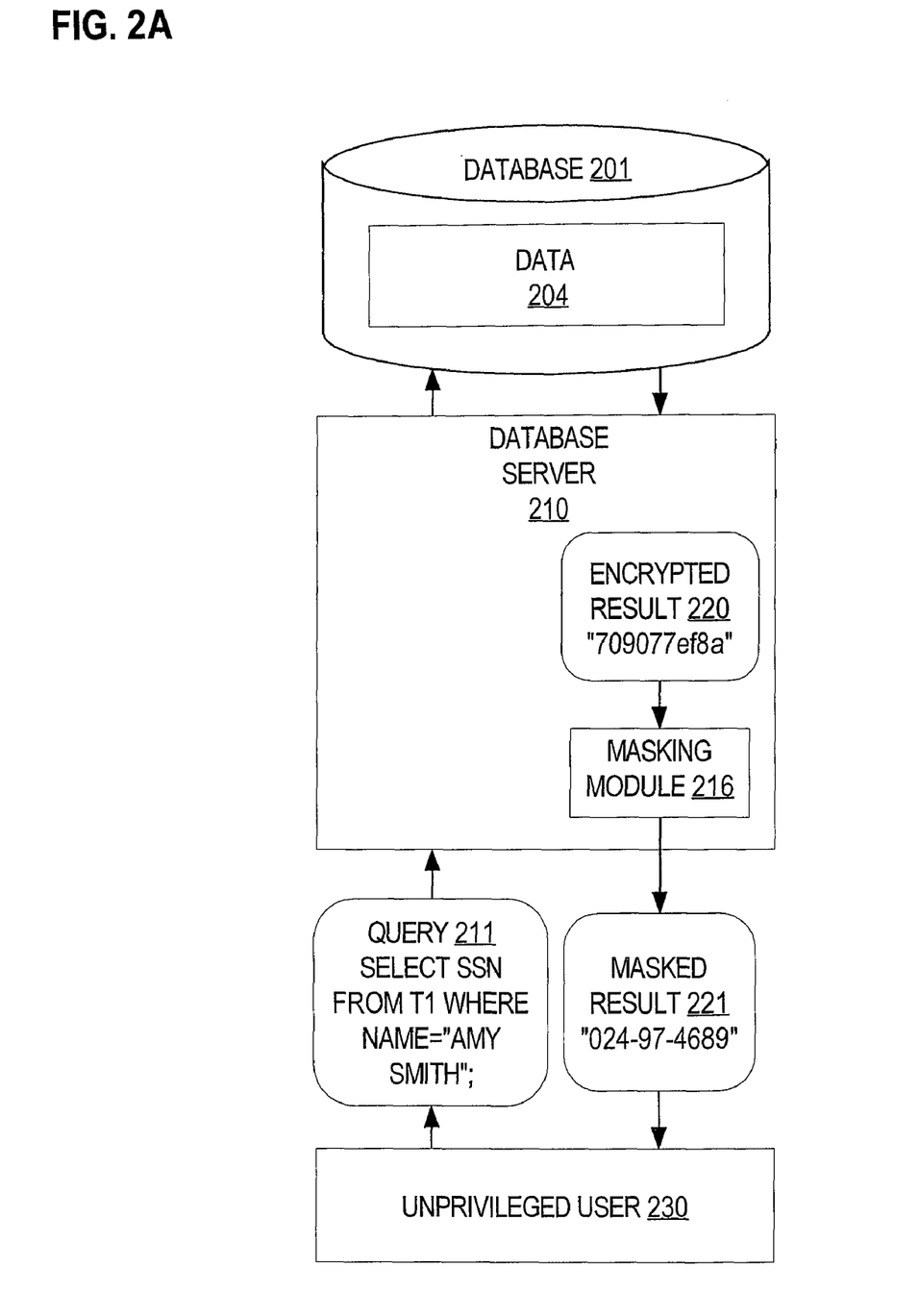
FIG. 2A is a diagram illustrating an example computer system for masking a result of a query evaluated against a database that stores data that may be encrypted or unencrypted.
Figure 2B:
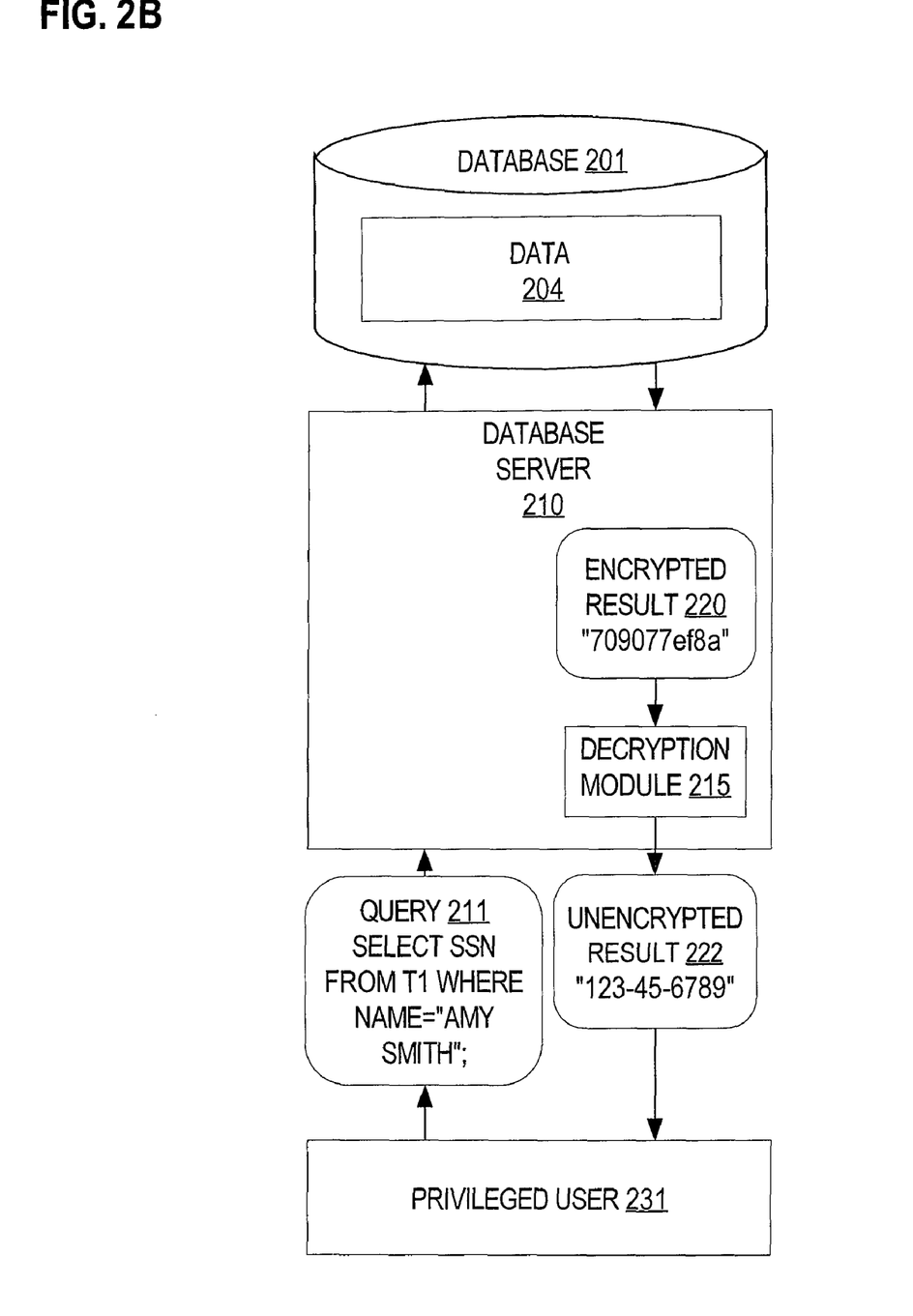
FIG. 2B is a diagram illustrating an example computer system for providing an unmasked result of a query evaluated against a database that stores data that may be encrypted or unencrypted.

FIGS. 2A and 2B illustrate a query 211 evaluated against data 204. In FIG. 2A, query 211 is sent from unprivileged user 230 to database server 210. As shown, query 211 requests a social security number for a person named "AMY SMITH." Database server 210 executes query 211 against database 201, accessing data 204, to generate an atomically encrypted result 220, "709077ef8a." In FIG. 2A, unprivileged user 230 is not privileged to access the underlying data. Encrypted result 220 is masked by masking module 216 to produce masked result 221, "024-97-4689," which conforms to one or more data characteristics. Masked result 221 is returned to unprivileged user 230. In FIG. 2B, privileged user 231 is privileged to access the underlying data, and encrypted result 220 is instead decrypted by decryption module 215 to unencrypted result 222, "123-45-6789," which is provided to privileged user 231.

Figure 3A:
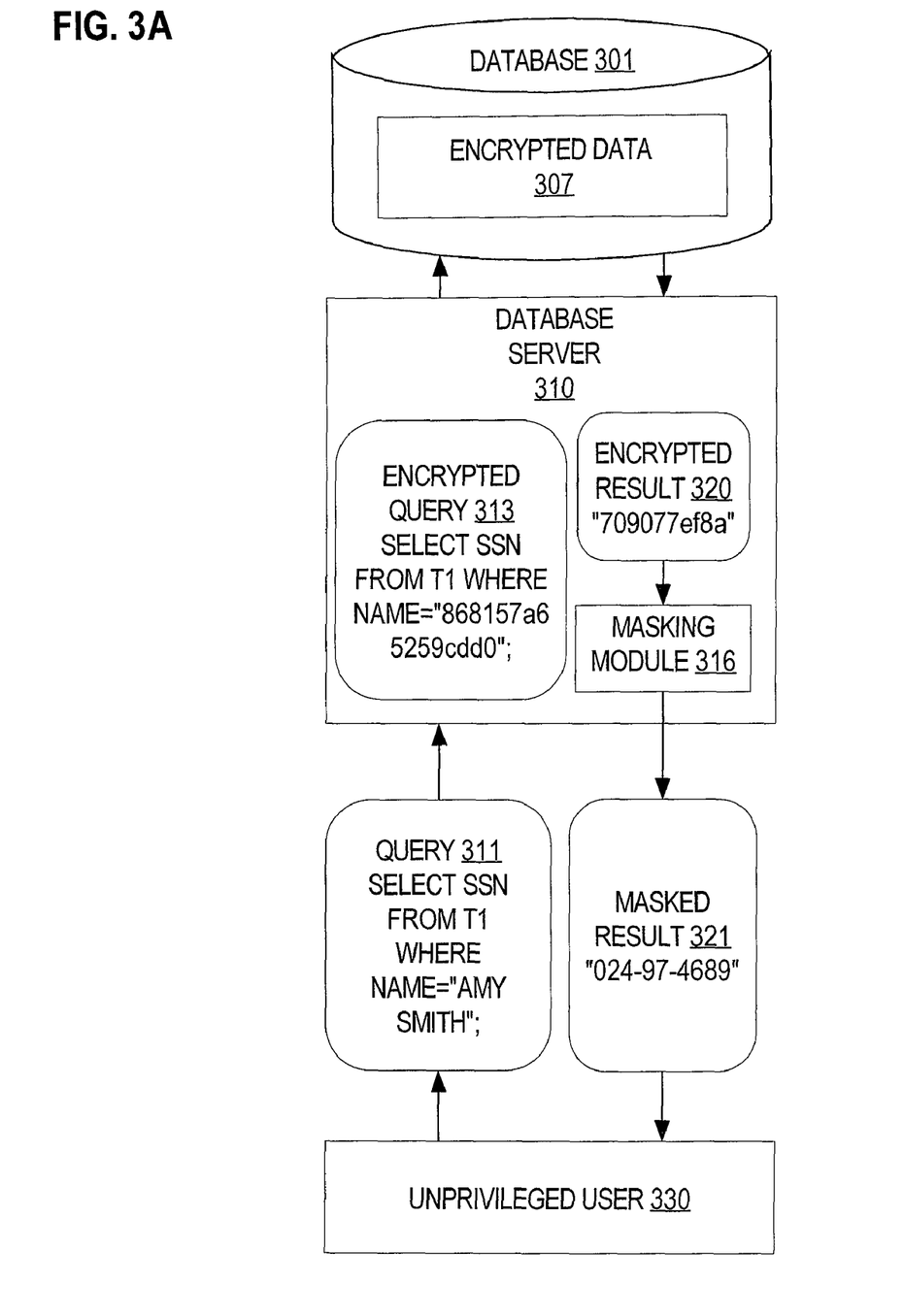
FIG. 3A is a diagram illustrating an example computer system for masking a result of a query evaluated against a database that stores encrypted data.
Figure 3B:
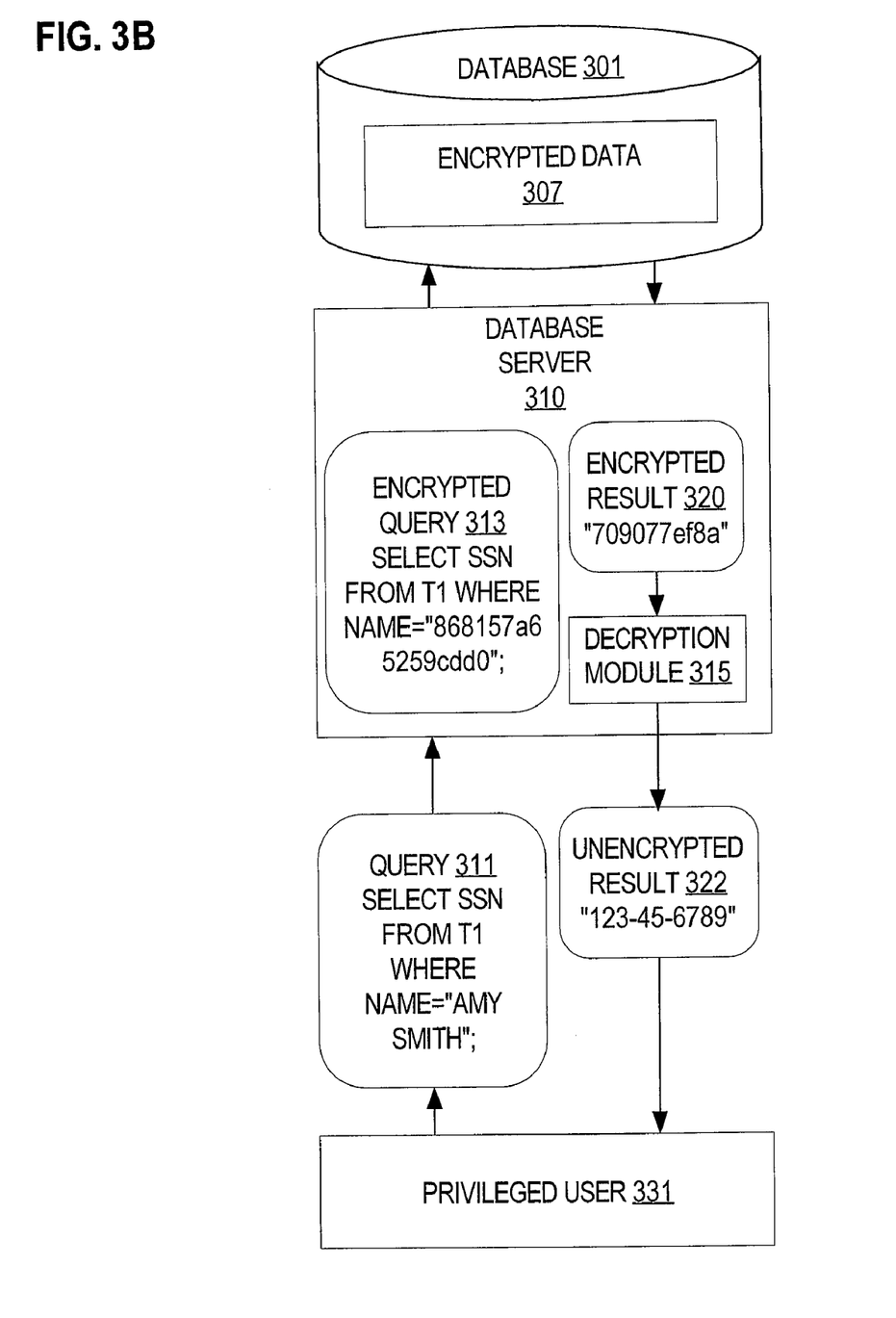
FIG. 3B is a diagram illustrating an example computer system for providing an unmasked result of a query evaluated against a database that stores encrypted data.

FIGS. 3A and 3B illustrate a query 311 evaluated against encrypted data 307. In FIG. 3A, query 311 is sent from unprivileged user 330 to database server 310. As shown, query 311 requests a social security number for a person named "AMY SMITH." Query 311 is rewritten into encrypted query 313 that references encrypted data 307. As shown, "AMY SMITH" is rewritten to "868157a65259cdd0." Database server 310 executes encrypted query 313 against database 301, accessing encrypted data 307, to generate an atomically encrypted result 320, "709077ef8a." In FIG. 3A, unprivileged user 330 is not privileged to access the underlying data. Encrypted result 320 is masked by masking module 316 to produce masked result 321, "024-97-4689," which conforms to one or more data characteristics. Masked result 321 is returned to unprivileged user 330. In FIG. 3B, privileged user 331 is privileged to access the underlying data, and encrypted result 320 is instead decrypted by decryption module 315 to unencrypted result 322, "123-45-6789," which is provided to privileged user 331.

Figure 4A:
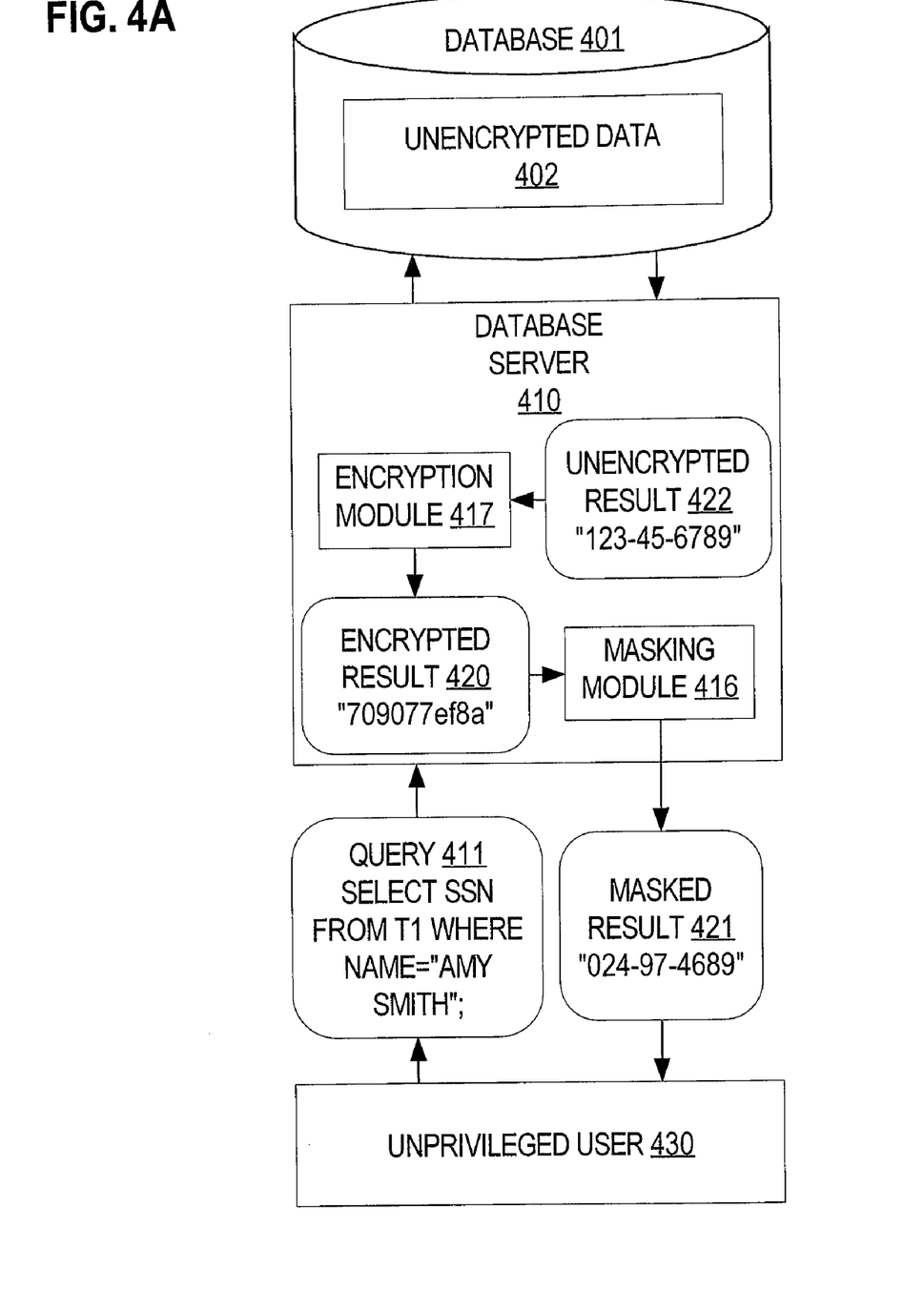
FIG. 4A is a diagram illustrating an example computer system for masking a result of a query evaluated against a database that stores unencrypted data.
Figure 4B:
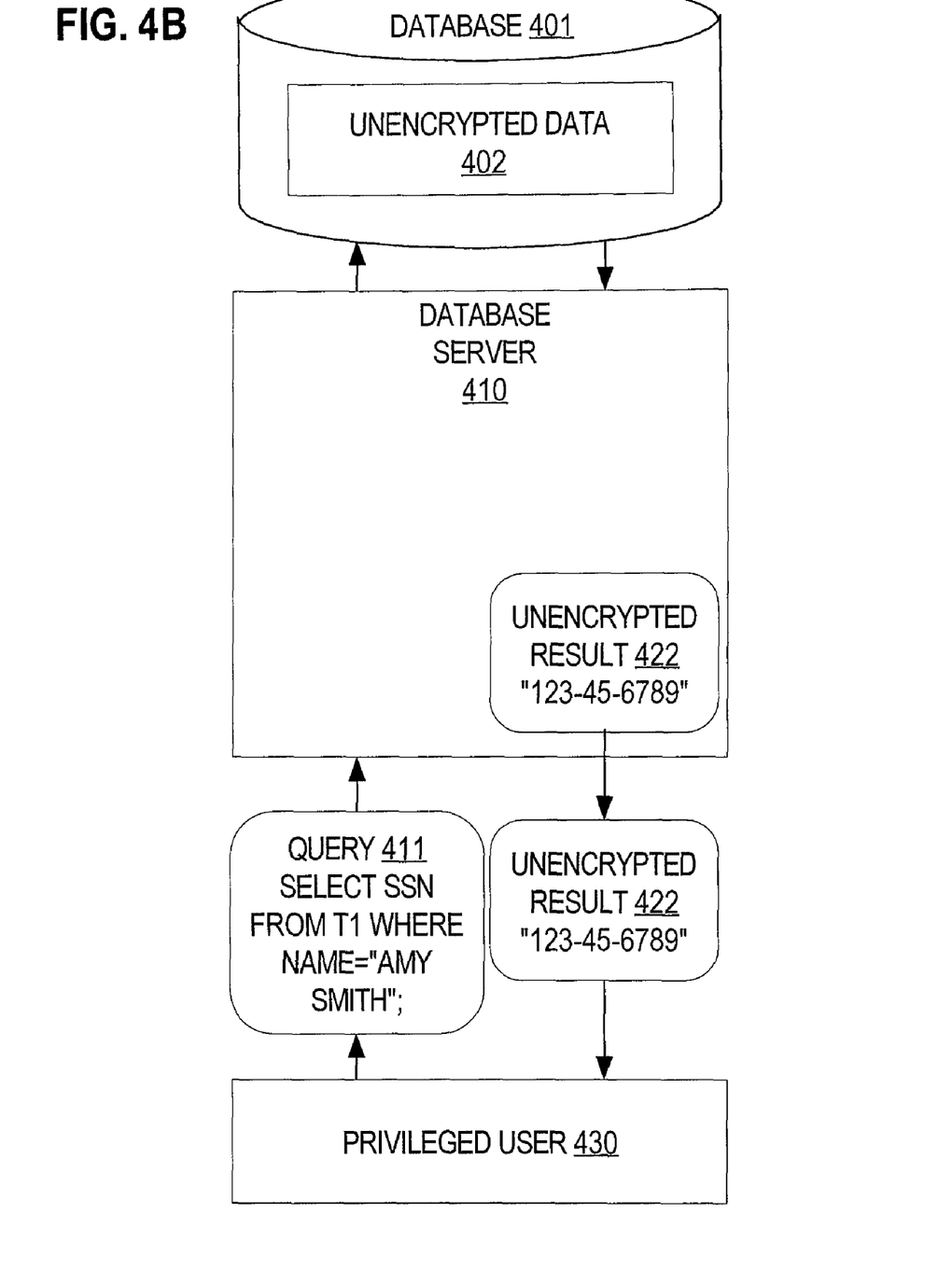
FIG. 4B is a diagram illustrating an example computer system for providing an unmasked result of a query evaluated against a database that stores unencrypted data.

FIGS. 4A and 4B illustrate a query 411 evaluated against unencrypted data 404. In FIG. 4A, query 411 is sent from unprivileged user 430 to database server 410. As shown, query 411 requests a social security number for a person named "AMY SMITH." Database server 410 executes query 411 against database 401, accessing unencrypted data 404, to generate an unencrypted result 422, "123-45-6789." In FIG. 4A, unprivileged user 430 is not privileged to access unencrypted result 422. Unencrypted result 422 is encrypted by encryption module 417 to produce encrypted result 420. Encrypted result 420 is masked by masking module 416 to produce masked result 421, "024-97-4689," which conforms to one or more data characteristics. Masked result 421 is returned to unprivileged user 430. In FIG. 4B, privileged user 431 is privileged to access unencrypted result 422, "123-45-6789," which is provided to privileged user 431.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
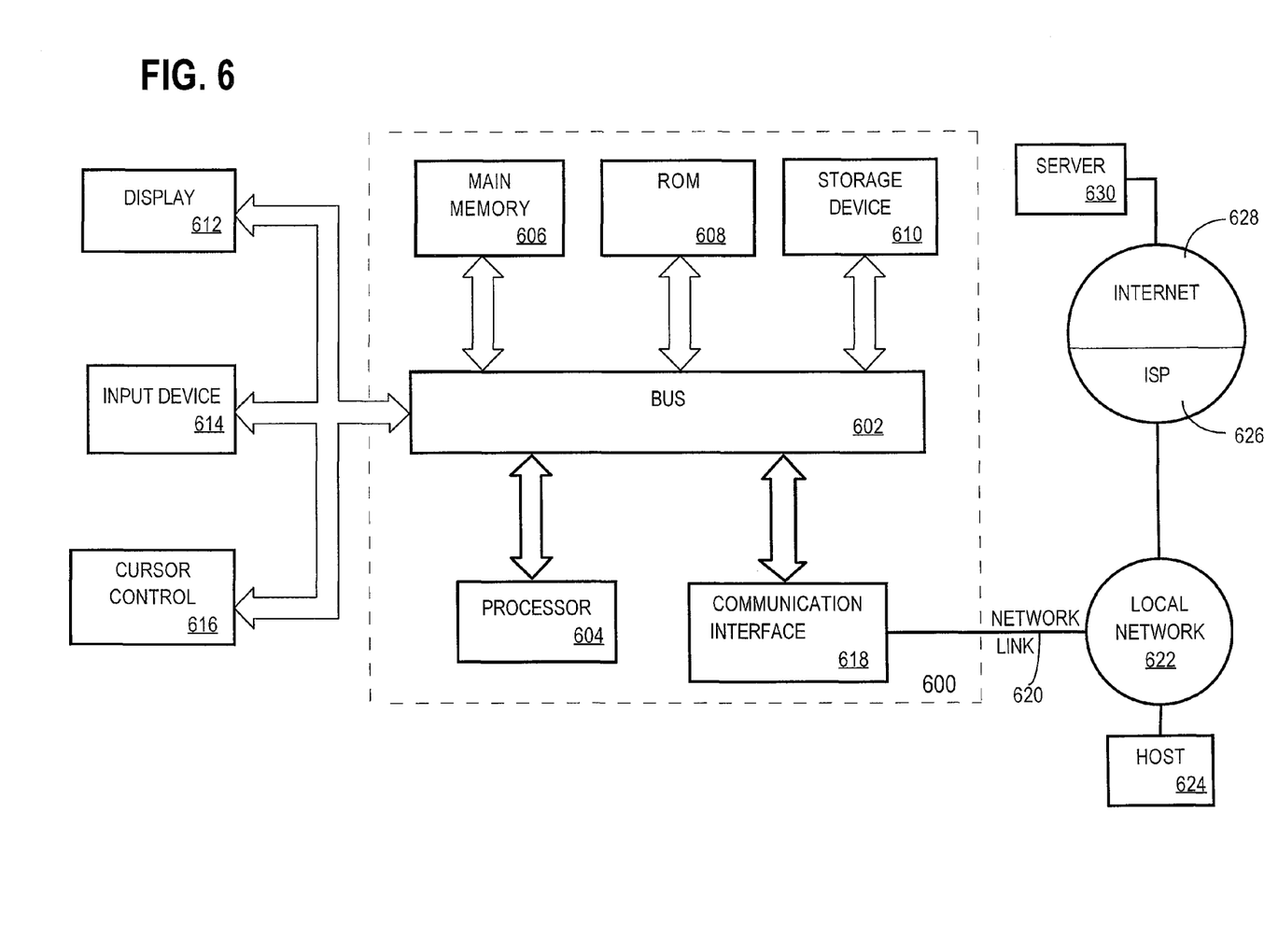
FIG. 6 is a diagram illustrating an example computer system upon which the techniques described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   storing, in a database maintained on one or more storage devices, a plurality of cryptographically transformed values;
   receiving a request to access data from the database;
   determining, from the plurality of cryptographically transformed values, a cryptographically transformed result of the request;
   determining one or more data characteristics that indicate a data format for masking the cryptographically transformed result, wherein the cryptographically transformed result does not conform to the one or more data characteristics that indicate the data format;
   without decrypting the cryptographically transformed result, generating, from at least part of the cryptographically transformed result, a masked result that conforms to the one or more data characteristics, wherein the masked result varies based on the at least part of the cryptographically transformed result;
   wherein the method is performed by one or more computing devices that have been configured to perform the method.

2. The method of claim 1, wherein the one or more data characteristics indicate a data type.

3. The method of claim 2, wherein the generating the masked result comprises type casting a particular number of bits of the cryptographically transformed result to the data type.

4. The method of claim 1, wherein the generating the masked result comprises formatting a particular number of bits of the cryptographically transformed result to the data format.

5. The method of claim 1, wherein the generating the masked result comprises mapping the cryptographically transformed result to a masked value in a set of masked values that conform to the one or more data characteristics.

6. The method of claim 1, wherein the determining the one or more data characteristics comprises:
   accessing information received with the request, wherein the information identifies the one or more data characteristics for masking the cryptographically transformed result.

7. The method of claim 1, wherein the determining the one or more data characteristics comprises:
   accessing information stored in association with the cryptographically transformed result, wherein the information identifies the one or more data characteristics for masking the cryptographically transformed result.

8. The method of claim 1, further comprising:
   determining whether the request is privileged with respect to the data;
   wherein the generating the masked result is performed in response to determining that the request is not privileged with respect to the data.

9. The method of claim 1, further comprising:
   storing an index of the plurality of cryptographically transformed values; and
   wherein determining the cryptographically transformed result comprises evaluating the request against the index.

10. The method of claim 5, wherein the at least part of the cryptographically transformed result as a whole is used to determine the masked value as a whole from the set of masked values, and wherein the masked value as a whole varies based on the at least part of the cryptographically transformed result as a whole.

11. A method comprising:
    storing, in a database maintained on one or more storage devices, a plurality of unencrypted values and one or more data characteristics that indicate a data format for the plurality of unencrypted values;
    receiving a request to access data from the database;
    determining, from the plurality of unencrypted values, an unencrypted result of the request, wherein the unencrypted result conforms to the one or more data characteristics;
    generating a cryptographically transformed result from the unencrypted result, wherein the cryptographically transformed result does not conform to the one or more data characteristics that indicate the data format;
    determining the one or more data characteristics for masking the cryptographically transformed result;
    without decrypting the cryptographically transformed result, generating, from at least part of the cryptographically transformed result, a masked result that conforms to the one or more data characteristics, wherein the masked result varies based on the at least part of the cryptographically transformed result;
    wherein the method is performed by one or more computing devices that have been configured to perform the method.

12. The method of claim 11, wherein the one or more data characteristics indicate a data type, and wherein the generating the masked result comprises type casting a particular number of bits of the cryptographically transformed result to the data type.

13. The method of claim 11, wherein the generating the masked result comprises formatting a particular number of bits of the cryptographically transformed result to the data format.

14. The method of claim 11, wherein the generating the masked result comprises mapping the cryptographically transformed result to a masked value in a set of masked values that conform to the one or more data characteristics.

15. The method of claim 14, wherein the at least part of the cryptographically transformed result as a whole is used to determine the masked value as a whole from the set of masked values, and wherein the masked value as a whole varies based on the at least part of the cryptographically transformed result as a whole.

16. One or more non-transitory storage media storing instructions which, when executed by one or more computing devices, cause performance of:
storing, in a database maintained on one or more storage devices, a plurality of cryptographically transformed values;
receiving a request to access data from the database;
determining, from the plurality of cryptographically transformed values, a cryptographically transformed result of the request;
determining one or more data characteristics that indicate a data format for masking the cryptographically transformed result, wherein the cryptographically transformed result does not conform to the one or more data characteristics that indicate the data format;
without decrypting the cryptographically transformed result, generating, from at least part of the cryptographically transformed result, a masked result that conforms to the one or more data characteristics, wherein the masked result varies based on the at least part of the cryptographically transformed result.

17. One or more non-transitory storage media as recited in claim 16, wherein the data characteristic indicates a data type.

18. One or more non-transitory storage media as recited in claim 17, wherein the generating the masked result comprises type casting a particular number of bits of the cryptographically transformed result to the data type.

19. One or more non-transitory storage media as recited in claim 16, wherein the generating the masked result comprises formatting a particular number of bits of the cryptographically transformed result to the data format.

20. One or more non-transitory storage media as recited in claim 16, wherein the generating the masked result comprises mapping the cryptographically transformed result to a masked value in a set of masked values that conform to the one or more data characteristics.

21. One or more non-transitory storage media as recited in claim 20, wherein the at least part of the cryptographically transformed result as a whole is used to determine the masked value as a whole from the set of masked values, and wherein the masked value as a whole varies based on the at least part of the cryptographically transformed result as a whole.

22. A database appliance comprising:
one or more processors;
one or more storage devices storing a database that includes a plurality of cryptographically transformed values;
a database server receiving a request to access data from the database;
the database server determining, from the plurality of cryptographically transformed values, a cryptographically transformed result of the request;
the database server determining one or more data characteristics that indicate a data format for masking the cryptographically transformed result, wherein the cryptographically transformed result does not conform to the one or more data characteristics that indicate the data format;
without decrypting the cryptographically transformed result, the database server generating, from at least part of the cryptographically transformed result, a masked result that conforms to the one or more data characteristics, wherein the masked result varies based on the at least part of the cryptographically transformed result.

23. The database appliance of claim 22, wherein the data characteristic indicates a data type, and wherein the generating the masked result comprises type casting a particular number of bits of the cryptographically transformed result to the data type.

24. The database appliance of claim 22, wherein the generating the masked result comprises formatting a particular number of bits of the cryptographically transformed result to the data format.

25. The database appliance of claim 22, wherein the generating the masked result comprises mapping the cryptographically transformed result to a masked value in a set of masked values that conform to the one or more data characteristics.

26. The database appliance of claim 25, wherein the at least part of the cryptographically transformed result as a whole is used to determine the masked value as a whole from the set of masked values, and wherein the masked value as a whole varies based on the at least part of the cryptographically transformed result as a whole.

27. One or more non-transitory storage media storing instructions which, when executed by one or more computing devices, cause performance of:
storing, in a database maintained on one or more storage devices, a plurality of unencrypted values and one or more data characteristics that indicate a data format for the plurality of unencrypted values;
receiving a request to access data from the database;
determining, from the plurality of unencrypted values, an unencrypted result of the request, wherein the unencrypted result conforms to the one or more data characteristics;
generating a cryptographically transformed result from the unencrypted result, wherein the cryptographically transformed result does not conform to the one or more data characteristics that indicate the data format;
determining the one or more data characteristics for masking the cryptographically transformed result;
without decrypting the cryptographically transformed result, generating, from at least part of the cryptographically transformed result, a masked result that conforms to the one or more data characteristics, wherein the masked result varies based on the at least part of the cryptographically transformed result.

28. One or more non-transitory storage media as recited in claim 27, wherein the one or more data characteristics indicate a data type, and wherein the generating the masked result comprises type casting a particular number of bits of the cryptographically transformed result to the data type.

29. One or more non-transitory storage media as recited in claim 27, wherein the generating the masked result comprises formatting a particular number of bits of the cryptographically transformed result to the data format.

30. One or more non-transitory storage media as recited in claim 27, wherein the generating the masked result comprises mapping the cryptographically transformed result to a masked value in a set of masked values that conform to the one or more data characteristics.

31. One or more non-transitory storage media as recited in claim 30, wherein the at least part of the cryptographically transformed result as a whole is used to determine the masked value as a whole from the set of masked values, and wherein the masked value as a whole varies based on the at least part of the cryptographically transformed result as a whole.

* * * * *

UNITED STATES PATENT AND TRADEMARK OFFICE
CERTIFICATE OF CORRECTION

PATENT NO. : 8,375,224 B2  
APPLICATION NO. : 12/616127  
DATED : February 12, 2013  
INVENTOR(S) : Youn et al.

Page 1 of 1

It is certified that error appears in the above-identified patent and that said Letters Patent is hereby corrected as shown below:

On the Title page, in column 1, under "Assignee", line 2, delete "Rewood" and insert -- Redwood --, therefor.

Signed and Sealed this  
Fourteenth Day of May, 2013

Teresa Stanek Rea  
*Acting Director of the United States Patent and Trademark Office*